INVENTOR.
Leonard L. Smith.
BY
*William J. Ruano*
HIS ATTORNEY.

July 22, 1958     L. L. SMITH     2,844,390
TRACTOR HITCH OF THE AUTOMATIC COUPLING TYPE HAVING
CONNECTION FACILITATING MEANS Filed Nov. 30, 1956     2 Sheets-Sheet 2

INVENTOR.
Leonard L. Smith.
BY
*William J. Ruano*
HIS ATTORNEY.

United States Patent Office 2,844,390
Patented July 22, 1958

2,844,390

TRACTOR HITCH OF THE AUTOMATIC COUPLING TYPE HAVING CONNECTION FACILITATING MEANS

Leonard L. Smith, Denver, Pa.

Application November 30, 1956, Serial No. 625,529

2 Claims. (Cl. 280—477)

This invention relates to a tractor hitch and, more particularly, to improvements in such hitch so as to facilitate locking of the hitch to an implement even though the two are not in horizontal alignment and to effect such locking in an automatic manner.

An outstanding disadvantage of conventional tractor hitches is that the tongue or other connecting element of the implement, or other device drawn by the tractor, must be carefully adjusted in height to correspond to the height of the hitch connection before the two can be brought together and locked. This is a laborious and time consuming task, particularly in the case of heavy implements. Furthermore manual locking means have been conventionally used to effect locking which is also time consuming and involves considerable manual effort.

An object of the present invention is to provide a novel tractor hitch which is devoid of the above mentioned disadvantages and which is easily and quickly connected or disconnected, irrespective of the lack of vertical alignment of the connectible members of the tractor hitch and implement.

A more specific object of the invention is to provide a novel guide means for a tractor hitch which will guide the tongue or connecting member of the implement into proper connecting position and will automatically lock the two together without the necessity of handling the connectible members.

A further object of the invention is to provide a foldable stand for holding the tongue of an implement in elevated position, which stand is automatically collapsible as a result of backing up of the hitch.

A still further object of the invention is to provide a jack for facilitating lifting and lowering movements of the connecting element of the implement as it is being connected to a hitch embodying the principles of the present invention.

Other objects and advantages of the invention will become more apparent from the study of the following description taken with the accompanying drawings wherein.

Figure 1:
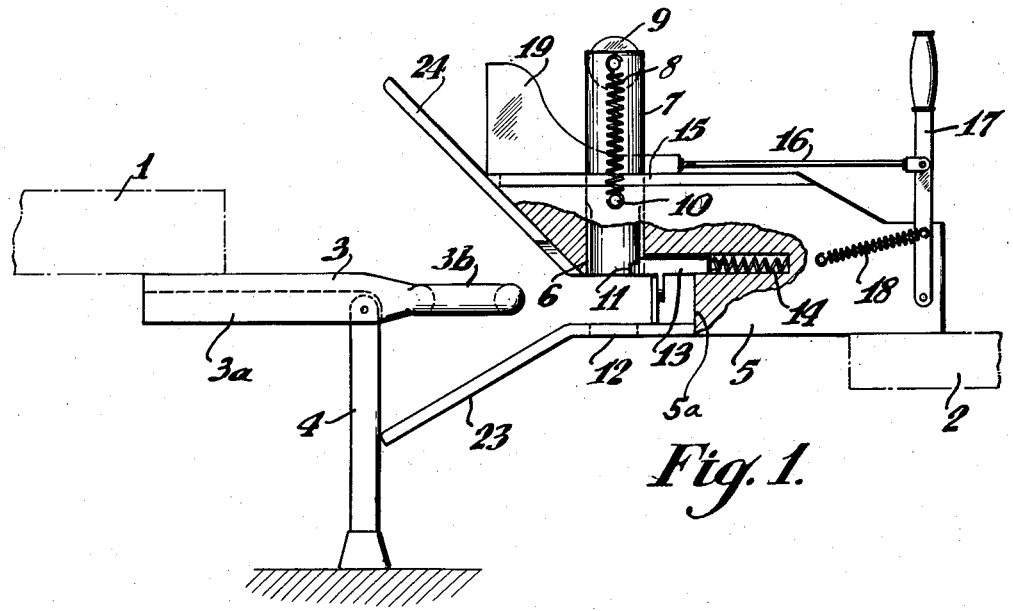
Figure 1 is a vertical elevational view, partly in section, of a tractor hitch embodying the principles of the present invention and showing the locking pin in retracted or latched position prior to coupling to an implement.
Figure 3:
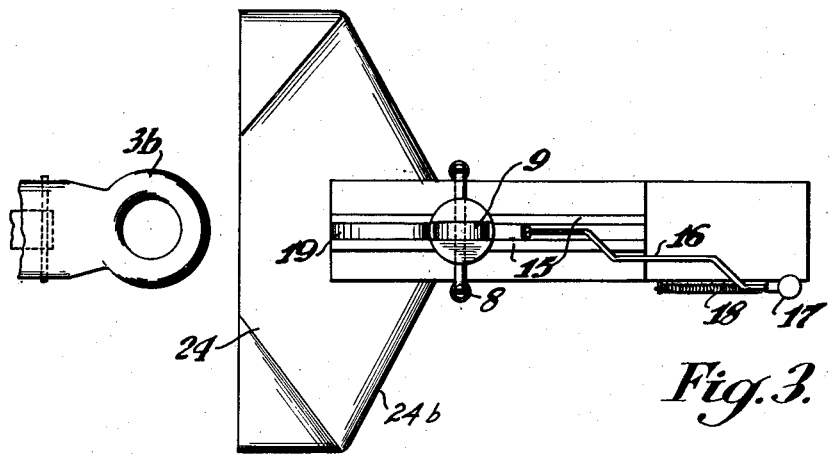
Figure 3 is a top view of the device shown in Fig. 1.

Referring more particularly to Figs. 1 and 3 of the drawing, numeral 1 generally denotes any drawn member such as an implement for tilling the soil, and numeral 2 denotes the rear end portion of a tractor, such as a draw bar thereof. The implement 1 has rigidly secured thereto a connecting member 3 having a lower cut out portion 3a forming a well or seat for accommodating the leg 4 which is pivotally mounted on member 3. Member 3 has an integral coupling ring 3b for connection to the tractor hitch.

Figure 4:
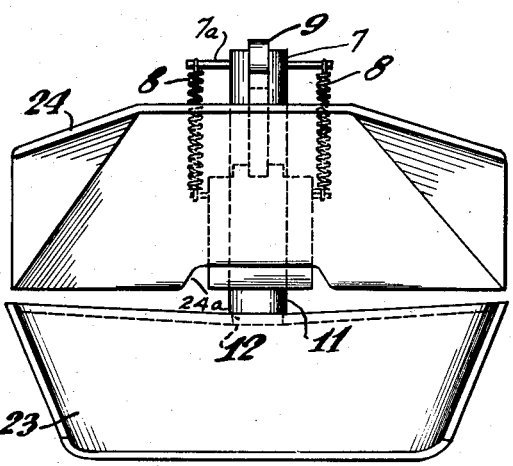
Figure 4 is an elevational view as viewed from the left of Fig. 2.

The tractor hitch comprises a body portion 5 of steel or other suitable material rigidly secured to the tractor and which is provided with a vertical bore 6 through which a retractible plunger 7 is adapted to slide. Plunger 7 is provided with a horizontally extending pin 7a, best seen in Fig. 4, to the ends of which are connected the top ends of helical springs 8. The bottom ends of springs 8 are connected to horizontal pins 10 rigidly secured to body 5.

A notch 11 is formed at the bottom and side portion of pin 7 for latching engagement with a horizontally slidable latch 13 which is biased to the left, as viewed in Fig. 1, by means of spring 14 seated in a horizontal groove formed in body 5.

On the top of body 5 there are mounted two cam guide rails 15 for guiding a cam 19 horizontally in a forward or rearward direction, which cam is connected by a cam control rod 16 to a lever 17 which is biased rearwardly by a return spring 18.

Figure 2:
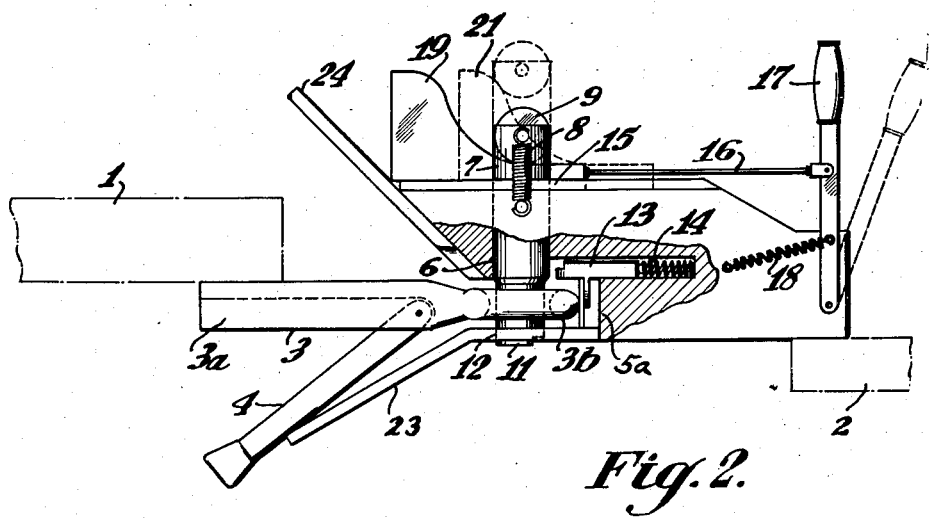
Figure 2 is a view similar to Fig. 1 except that it shows the locking pin in the unlatched position so as to lock the implement to the tractor and also showing the implement stand in the collapsed position.

In operation, when the parts are in the unlocked position shown in Fig. 1, the tractor is backed up toward the implement 1 until the coupling ring 3b of the implement strikes the vertically extending element of latch 13 and moves it to the position shown in Fig. 2 wherein it no longer latches pin 7. Thereupon, by virtue of the tension of springs 8, pin 7 is forcibly and suddenly moved downwardly through the eye of coupling ring 3b and through hole 12 in bottom ramp 23 in Fig. 2 so as to automatically lock the implement to the tractor hitch.

In the meanwhile, that is, while hitch is being backed up from the position shown in Fig. 1 to that shown in Fig. 2, the lower guide ramp 23 will strike against leg 4 and cause it to collapse to the position shown in Fig. 2, or into a higher position more closely approaching well portion 3a, depending upon the angularity of ramp 23. The tractor may now be driven forwardly to draw the implement 3.

Another important feature of the invention resides in the angular shaping of the lower and upper guide ramps 23 and 24 respectively. Ramps 23 and 24 are flared rearwardly and outwardly from the space between ramps 23 and 24 in a vertical plane, as shown, so that if tongue 3b is in a higher or lower position than that shown in Fig. 1 it will strike against either the upper or lower ramp and will be guided into seat 5a formed in body 5 immediately below latch 13. In order to guide tongue 3b if it is laterally offset relative to the seat 5a, angularly disposed guiding edges 24b are provided (see Fig. 3) for horizontally directing or guiding coupling ring 3b to its seat 5a. Shim plates (not shown) may extend along edges 24b and may be sandwiched between ramps 23 and 24 if desired. Ramp 24 is preferably provided with a cut out portion 24a for allowing dirt to fall out that might be introduced by the coupling ring. Wing portions may be provided in the top corners of ramp 24, to further aid inward guiding of ring 3b, although such wings are not absolutely necessary.

After the implement 1 is locked to the hitch as shown in Fig. 2, in order to disconnect or uncouple the implement, control lever 17 is moved forwardly to the position as shown in dash lines thereby sliding cam 19 forwardly to position 21 and, in so doing, allowing roller 9 to roll on the top of the cam and to be moved vertically upwardly to the position shown in dash outline. As roller 9 is moved upwardly it will raise pin 7 to the retracted position shown in Fig. 1. Latch 13 will then be urged into latching position by spring 14. Control lever 17, when released, is then moved to the full line position by spring 18 so that pin 7 will be free to move downwardly upon unlatching of latch 13 when it is desired again to repeat the operation and couple the coupling ring 3b to the hitch.

Figure 5:
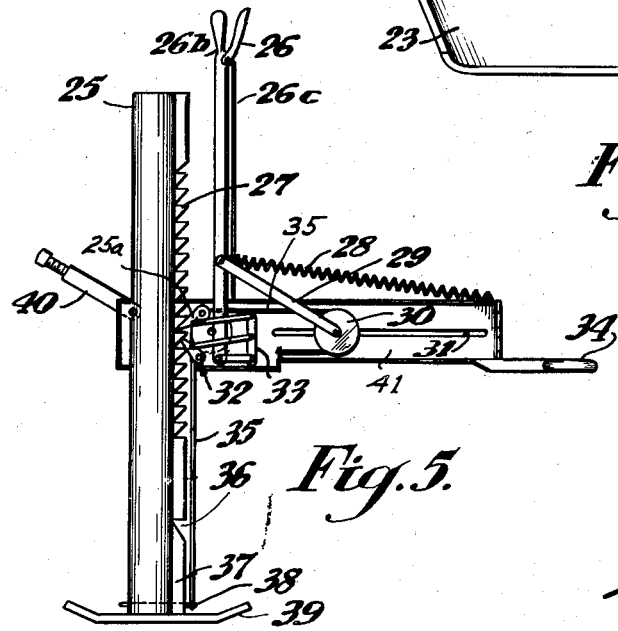
Figure 5 is an elevational view, partly in section, of a jack for facilitating lifting and lowering movement of the connecting member of the implement.

Fig. 5 shows a jack for facilitating lifting and lowering movements of a connecting member of the implement. A jack stand 25 is provided having teeth 27 engageable by pawl 25a. A pawl control handle 26 is provided with a lever 26b to lift and lower the frame 41 through rod 26c, which lever is pivotally biased to the right by spring 28 which counterbalances the weight of the jack. A link 29 connects the lever to a roller 30 used to pull the jack up, which roller is guided by slots 31 in horizontal frame 41. A second pawl 32 is used for lifting in the upward position which acts through rods 33. A coupling ring 34 is rigidly secured to the vertically movable horizontal frame 41 of the jack. A cable or chain 35 is provided to lift the jack. A tooth 36 is formed in the jack stand to hold the jack up. A tie 38 fastens the lower end of the cable to the jack stand, which stand is supported by base 39. An auxiliary screw 40 is also provided which engages stand 25 to hold frame 41 at any selected height.

In operation, the tractor and hitch as described above are backed up causing coupling ring 34 to ascend the ramp 23 of the hitch taking the weight from the stand of the jack. The pawl control handle 26 is then squeezed thereby releasing the pawl 25a and the lever 26b is pulled forwardly which will run the forward roller 30 with the cable over it toward the front, lifting the jack stand to the upper position so that the pawl 32 will drop in the tooth 36 of the jack stand and hold it there.

To unhook the implement, handle 26 is squeezed to release the pawl 32 and the lever 26b is pushed back, whereupon the jack stand will drop to the ground. The pawl 25a will then drop in one of the teeth 27 and hold the stand about 14 inches lower.

Thus it will be seen that I have provided an efficient tractor hitch including guide means for automatically guiding and centering the connecting member of a drawn device, such as the coupling ring of an implement, with respect to the corresponding coupling member of the hitch, even though they are not at the same height, therefore eliminating the necessity of manually bringing the coupling members together; furthermore I have provided a tractor hitch which is automatic in operation so that the mere seating of the coupling elements will unlatch a locking pin to automatically lock them together; furthermore I have provided a tractor hitch which may be remotely controlled from the driver's seat on the tractor so that coupling or uncoupling may be effected without the necessity of the driver's leaving his seat.

While I have illustrated and described several embodiments of my invention, it will be understood that these are by way of illustration only, and that various changes and modifications may be made within the contemplation of my invention and within the scope of the following claims.

I claim:

1. A tractor hitch comprising a body portion having a vertically extending hole, a locking pin slidable in said hole, a roller mounted on top of said pin and having an axle, a pair of springs whose upper ends are connected to the ends of said axle and the lower ends of which are connected to said body so as to bias the pin downwardly into locking position, a cam horizontally slidable on said body and engageable with said roller, a control lever for sliding said cam, a spring biased latch engageable in a notched out portion of said pin, and a seat formed in said body adjacent the lower end of said pin for receiving a coupling ring of a drawn implement, said latch being engageable by said coupling ring to unlatch said pin and allow it to move through said coupling ring and effect locking of the implement to the hitch.

2. A tractor hitch as recited in claim 1 together with a pair of vertically spaced guide ramps flared outwardly in the direction of the implement so as to strike against and guide said coupling ring toward said seat when not at the same level as the seat.

References Cited in the file of this patent

UNITED STATES PATENTS

| | | |
|---|---|---|
| 1,226,687 | Mowry | May 22, 1917 |
| 1,626,993 | Williams | May 3, 1927 |
| 1,939,463 | Rockinger | Dec. 12, 1933 |
| 2,113,338 | Wohldorf | Apr. 5, 1938 |
| 2,153,722 | Loughmiller | Apr. 11, 1939 |
| 2,339,746 | Klaus et al. | May 7, 1946 |
| 2,474,483 | Luttrell | June 28, 1949 |

FOREIGN PATENTS

| | | |
|---|---|---|
| 488,969 | Germany | Jan. 10, 1930 |
| 832,105 | Germany | Feb. 21, 1952 |